P. R. GRAHAM.
FARM GATE.
APPLICATION FILED APR. 1, 1909.
933,552.
Patented Sept. 7, 1909.
2 SHEETS—SHEET 1.
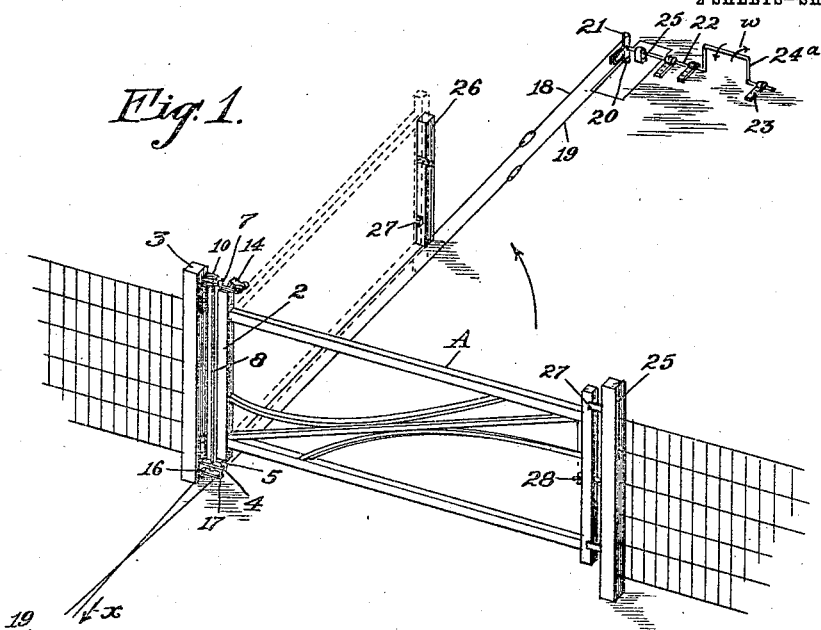
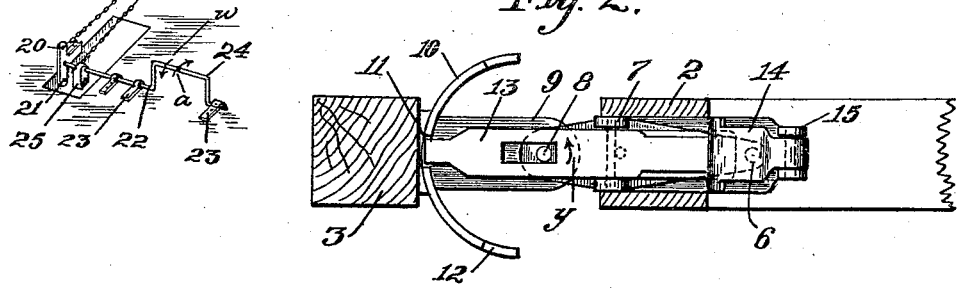
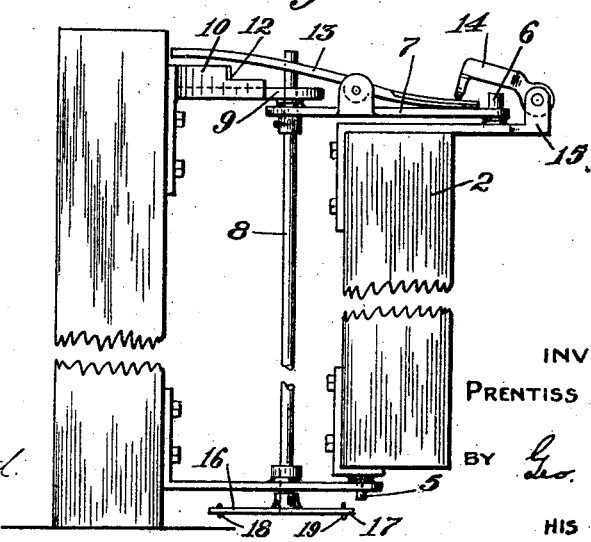
WITNESSES:
INVENTOR
PRENTISS R. GRAHAM
HIS ATTORNEY.

P. R. GRAHAM.
FARM GATE.
APPLICATION FILED APR. 1, 1909.

933,552.

Patented Sept. 7, 1909.
2 SHEETS—SHEET 2.

WITNESSES;
R. S. Berry.
F. E. Maynard.

INVENTOR
PRENTIS R. GRAHAM
BY Geo. H. Strong
HIS ATTORNEY.

UNITED STATES PATENT OFFICE.

PRENTISS R. GRAHAM, OF PETALUMA, CALIFORNIA.

FARM-GATE.

933,552.      Specification of Letters Patent.      Patented Sept. 7, 1909.

Application filed April 1, 1909. Serial No. 487,199.

*To all whom it may concern:*

Be it known that I, PRENTISS R. GRAHAM, citizen of the United States, residing at Petaluma, in the county of Sonoma and State of California, have invented new and useful Improvements in Farm-Gates, of which the following is a specification.

My invention relates to farm gates, and particularly to that class which are adapted to be opened or closed from a point remote from the gate by the wheels of a vehicle passing over an actuating device. The chief advantage in a gate of this character is that the driver or occupant of a vehicle will not be required to stop or get out, either to open or close the gate.

This invention consists of the parts and the construction and combination of parts as hereinafter more fully described and claimed, having reference to the accompanying drawings, in which—

Figure 4:
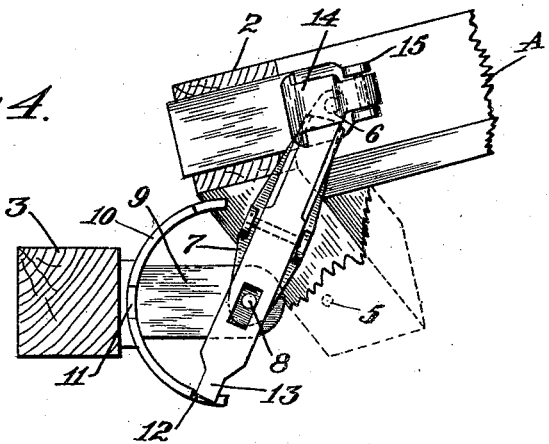
Figure 5:
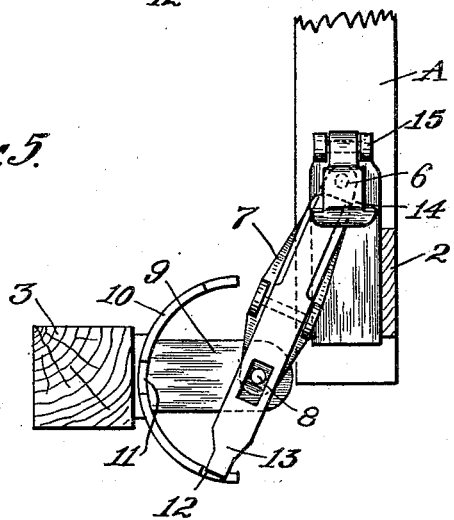
Figure 6:
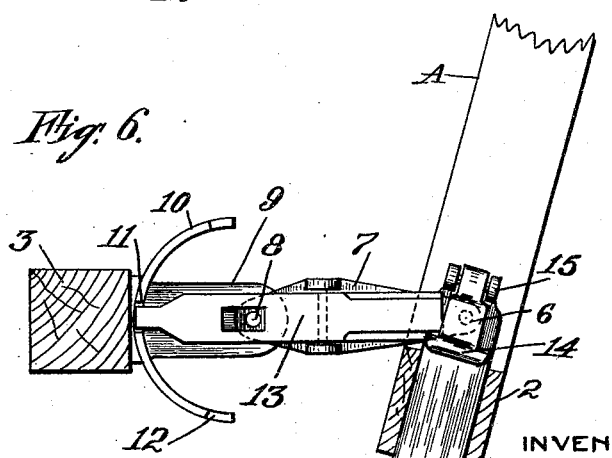

Figure 1 is a perspective view of the invention as applied. Fig. 2 is a detailed plan view of the swinging device, with the gate in the closed position. Fig. 3 is a view in elevation of the swinging device showing the pivotal mountings. Fig. 4 is a plan view of the swinging device at the moment of opening the gate. Fig. 5 is a view similar to Fig. 2 showing the gate in the opened position. Fig. 6 shows the swinging device at the moment of closing the gate.

A is a gate of any desired construction, having a vertically disposed frame member 2; 3 is a post on which the gate is carried; 4 is a socket bearing in which a pivot 5 on the lower end of the frame 2 is mounted.

The upper portion of the gate is pivotally mounted as at 6 to an arm 7, secured to a vertical shaft 8. This shaft is carried on the bearing 4, the upper end being supported by a bearing 9. A segment 10 is formed on the bearing 9, and is notched at 11 and 12, to receive the end of a lock bar 13 which is pivotally mounted on the arm 7, and is adapted to be released from the notches 11 and 12 at the proper time, as will be seen later, by a weighted member 14 hinged to the pivot plate 15 on the gate so that when the gate and the lever 13 are in line, member 14 will depress and lift it clear of the notches 11 and 12.

Rigidly affixed to the lower end of the shaft 8 are the arms 16 and 17, to which the cables 18 and 19 are attached. One extremity of each of the cables 18 and 19 on one side of the gate is secured to rocker arms 20 and 21 carried on a crank shaft 22 resting in bearings 23. The shaft 22 is bent to form a crank or lever 24, which is operated on by the wheels of a passing vehicle, or by the foot. A weight 25 on the shaft 22 retains the crank 24 in an upright position, as shown in Fig. 1. The other extremities of the cables 18 and 19, on the other side of the gate are similarly connected to the crank 24ª. Posts 25 and 26 having stops 27 are provided, to which the gate is latched by a catch 28, the post 25 holding the gate when in the closed position while the post 26 retains it while in an open position.

In operation, (see Fig. 1) as pressure is brought to bear upon the crank 24 in the direction of the arrow *a*, such, for instance, as by a vehicle wheel passing thereover, the cable 18 is pulled by the arm 21 in the direction of the arrow X, thereby rotating the shaft 8, arm 7, and lock bar 13 (as indicated by the arrow Y, Fig. 2) until the position shown in Fig. 4 is reached. This action, by reason of the pivotal bearing 6 being thrown out of vertical alinement with the bearing 5 raises the front end of the gate to disengage it from the keeper of latch 28, twists the gate so that it is thrown off center and tends to swing open.

To close the gate one or the other of the cranks 24 or 24ª is rocked in the direction of the arrow W, to pull the cable 18 in an opposite direction, thereby throwing the arm 7 back into the position shown in Fig. 6, thus causing the gate to close.

It is obvious that the gate may be opened or closed by operating either crank 24 or 24ª. Lock bar 13 is to insure the proper throw or twist of the gate so as to open or close it. As the arm 7 is rotated in opening the gate the lock bar 13 travels therewith until the position shown in Fig. 4 is reached, whereupon it falls into the notch 12; the weighted arm 14 being attached to the gate is caused to move sidewise and release the lever 13 to permit of this action. The lever 13, by reason of being held in the notch 12 prevents the gate from swinging back and retains the bearings 5 and 6 out of vertical alinement. As the gate completes its swing, the gate comes into line again with arm 7 and locking lever 13, so that the weight 14 is caused to slide back upon the lever arm 13, releasing it from the notch 12 so as to permit of the return of the lever over the segment 10, when the gate swings in the opposite direction.

It is understood that the movement of arm 7 and lever 13 sidewise either to open or to close the gate precedes the actual movement of the gate, since the arm 7 is mounted on the shaft 8, and of course, it is the rocking of this shaft which opens the gate; hence, although when the gate is closed the rear end of lever 13 stands directly over notch 11, it would be lifted clear of the notch 11 by reason of the weight 14; so that when the shaft 8 is rocked quickly it carries the lever 13 out from underneath the latch 14 and allows the lever then to slide over the segment 10, until it drops into the notch 12, thereby preventing the upper pivot 6 of the gate from swinging back accidentally into vertical line with the lower pivot before the gate is open.

Having thus described my invention, what I claim and desire to secure by Letters Patent is—

1. A gate having a fixed pivot at the bottom and a movable hinge at the top, a vertical shaft journaled adjacent to the pivoted end of the gate, said top hinge for the gate comprising an arm or plate radial to said shaft having one end fixed to said shaft and having the other end pivoting on the gate, means for rocking the shaft, and means when the shaft is rocked to hold it temporarily against return during the swinging of the gate, said last-named means including a lever pivotally mounted on an intermediate part of said arm and engageable with a stop mounted on a stationary support.

2. A gate having a fixed pivot at the bottom and a movable hinge at the top, a vertical shaft journaled adjacent to the pivoted end of the gate, said top hinge for the gate comprising an arm or plate radial to said shaft having one end fixed to said shaft and the other end pivoting on the gate, means for rocking the shaft, means when the shaft is rocked to hold it temporarily against return during the swinging of the gate, said last-named means including a lever pivotally mounted in an intermediate portion of said arm and engageable with a stop mounted on a stationary support, and means carried by the gate to release the latch from said stop.

3. A gate having a fixed pivot at the bottom and a movable hinge at the top, a vertical shaft journaled adjacent to the pivoted end of the gate, said top hinge for the gate comprising an arm or plate radial to said shaft having one end fixed to said shaft and the other end pivoting on the gate, means for rocking the shaft, means when the shaft is rocked to hold it temporarily against return during the swinging of the gate, said last-named means including a lever pivotally mounted in an intermediate portion of said arm and engageable with a stop mounted on a stationary support, and a weighted pivoted member on the gate engageable with the free end of said lever to release it from said stop.

4. In a gate, the combination of a fixed support, top and bottom brackets thereon, a vertical shaft journaled in said brackets, a gate having its lower end pivoted in the lower bracket, an arm having one end fixed to the shaft at the top of the gate, said arm having the opposite end pivoted to the top of the gate at a point more remote from the rear edge of the gate than the lower pivot, means for rocking the shaft, and a lever pivoted at its central portion to an intermediate part of the arm and engageable with a fixed stop to temporarily lock the shaft.

5. In a gate, the combination of a fixed support, top and bottom brackets thereon, a vertical shaft journaled in said brackets, a gate having its lower end pivoted in the lower bracket, an arm having one end fixed to the shaft at the top of the gate, said arm having its opposite end pivoted to the top of the gate at a point more remote from the rear edge of the gate than the lower pivot, means for rocking the shaft, a lever having its central portion pivoted on an intermediate part of the arm and engageable with a fixed stop to temporarily lock the shaft, and means carried by the gate to release said lever.

6. In a gate, the combination of a fixed support, top and bottom brackets thereon, a vertical shaft journaled in said brackets, a gate having its lower end pivoted in the lower bracket, an arm having one end fixed to the shaft at the top of the gate, said arm having its opposite end pivoted to the top of the gate at a point more remote from the rear edge of the gate than the lower pivot, means for rocking the shaft, a lever having its central portion pivoted on an intermediate part of the arm and engageable with a fixed stop to temporarily lock the shaft, and means carried by the gate to release said lever, said last-named means including a weighted pivoted member engageable with the lever when the latter and the gate are approximately in line.

In testimony whereof I have hereunto set my hand in presence of two subscribing witnesses.

PRENTISS R. GRAHAM.

Witnesses:
 JOHN W. THOMSON,
 J. H. GRAHAM.